Dec. 4, 1923.

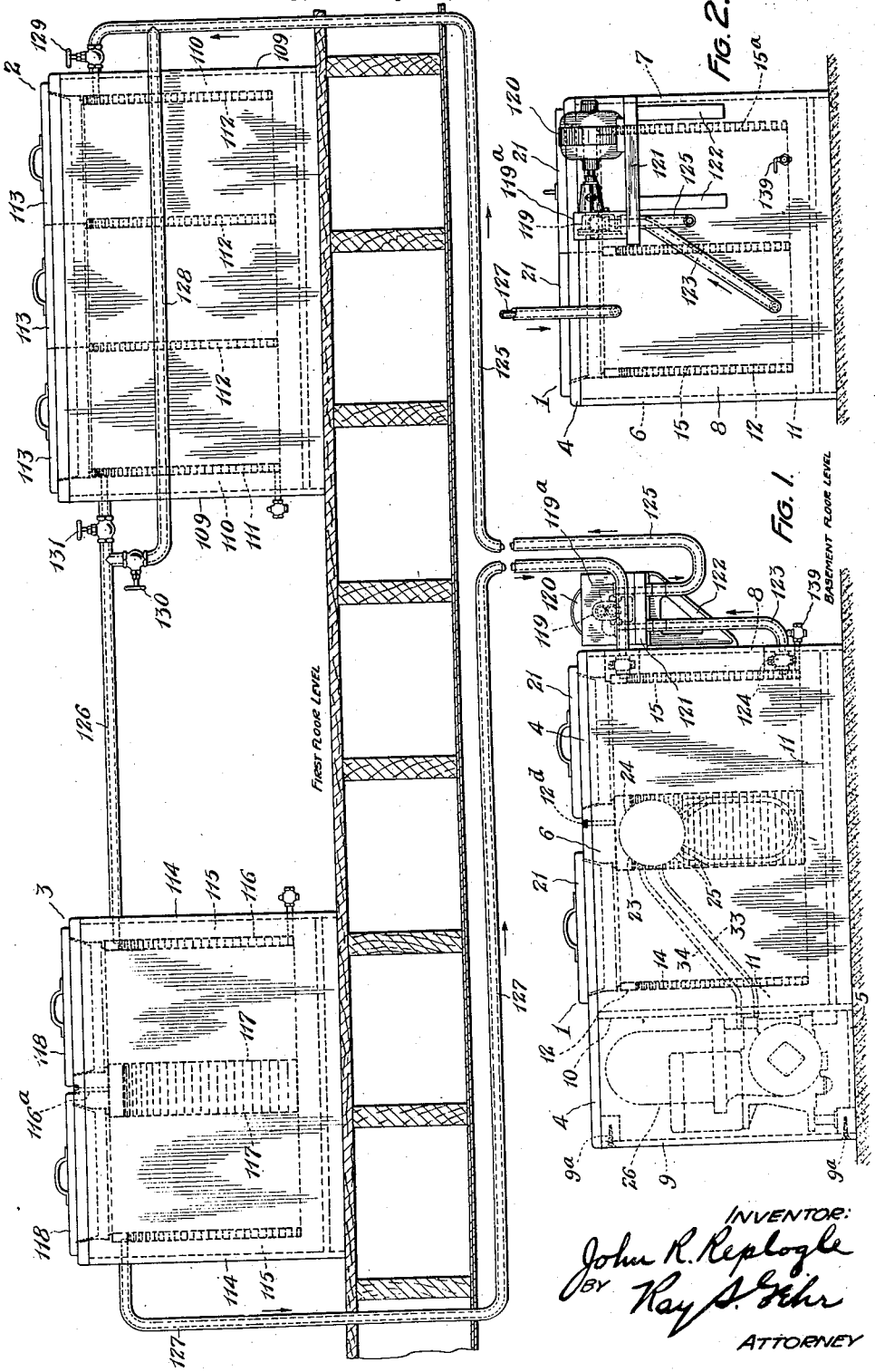

J. R. REPLOGLE 1,476,546

REFRIGERATING FOOD CABINET

Filed July 21, 1922

INVENTOR:
John R. Replogle
BY
Ray S. Gehr
ATTORNEY.

Dec. 4, 1923.

J. R. REPLOGLE 1,476,546

REFRIGERATING FOOD CABINET

Filed July 21, 1922      5 Sheets-Sheet 3

INVENTOR:
John R. Replogle
BY Ray A. Fehr
ATTORNEY.

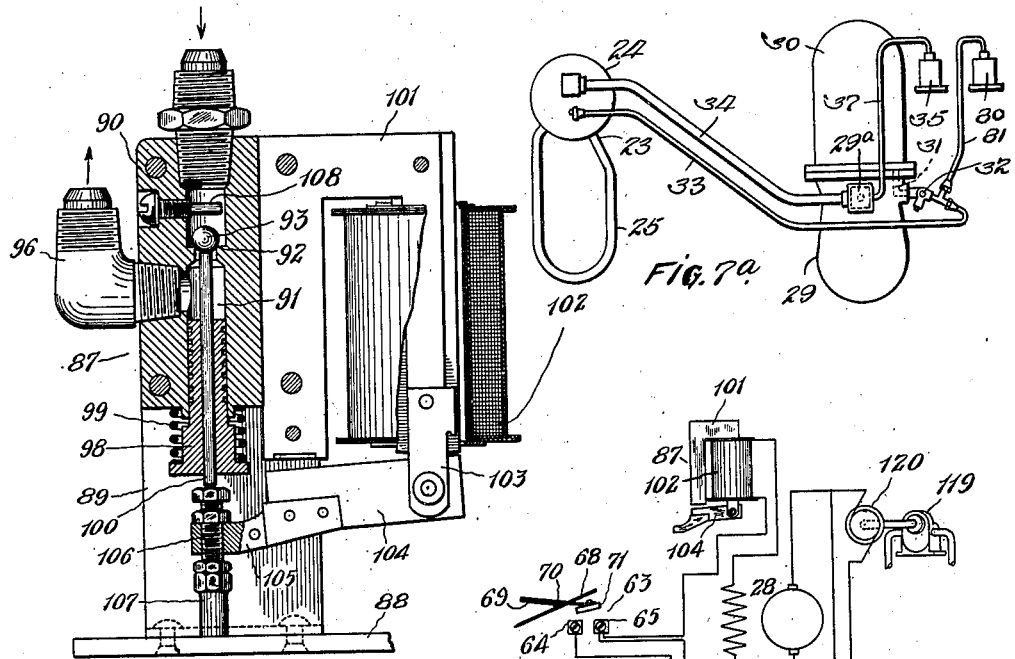

Dec. 4, 1923.  1,476,546
J. R. REPLOGLE
REFRIGERATING FOOD CABINET
Filed July 21, 1922  5 Sheets-Sheet 5
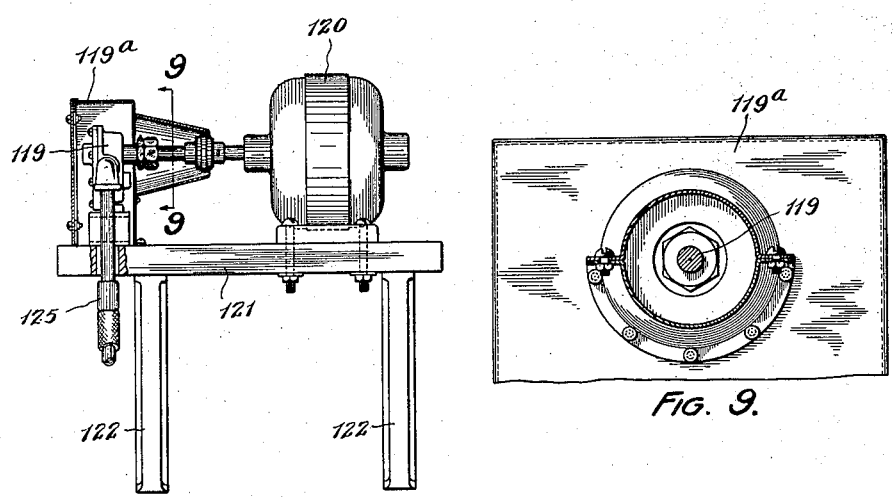
FIG. 8.
FIG. 9.
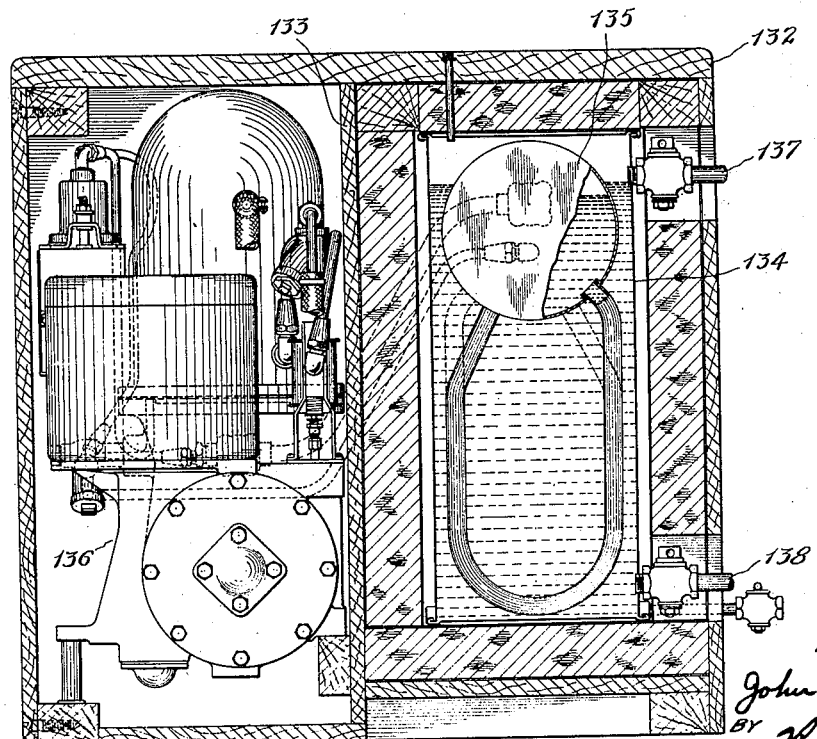
FIG. 10.
INVENTOR:
John R. Replogle
BY Ray A. Kehr
ATTORNEY.

Patented Dec. 4, 1923.

1,476,546

UNITED STATES PATENT OFFICE.

JOHN R. REPLOGLE, OF DETROIT, MICHIGAN, ASSIGNOR TO NIZER LABORATORIES COMPANY, OF DETROIT, MICHIGAN, A CORPORATION OF MICHIGAN.

REFRIGERATING FOOD CABINET.

Application filed July 21, 1922. Serial No. 576,477.

*To all whom it may concern:*

Be it known that I, JOHN R. REPLOGLE, a citizen of the United States, residing at Detroit, in the county of Wayne and State of Michigan, have invented certain new and useful Improvements in and Relating to Refrigerating Food Cabinets, of which the following is a specification, reference being made therein to the accompanying drawings.

The invention relates to refrigerating cabinets for food and the like and includes both improvements in the individual cabinet and an improved system of connecting and operating a plurality of cabinets as a unit.

While cabinets embodying my improvement are adapted for the holding of various kinds of foods and other materials at a desired low temperature, the invention is aimed more especially at the conditions involved in the storing of ice cream for sale by retail dealers. Such dealers have been accustomed to hold their ice cream in cabinets cooled by salt and ice mixtures, these cabinets being iced by the ice cream manufacturer who supplies the dealer. This practice is in many respects unsatisfactory both to the manufacturer and the dealer. The cost of the ice and salt and especially the cost of hauling large amounts of ice from the ice cream plant to the widely scattered stores of the dealers is very expensive for the ice cream manufacturer, and the carrying of ice and salt into stores and ice cream parlors by the drivers with the inevitable dropping of more or less ice and salt, is objectionable to the dealer. In addition the failure of the ice packed cabinet uniformly to maintain the ice cream at suitably low temperatures is unsatisfactory to both the manufacturer and the dealer for reasons well understood in the trade.

There have been some proposals to overcome these objections by installing mechanically refrigerated cabinets in ice cream parlors or dealers' stores, but as far as I am aware no successful installations of this character have been made prior to my invention. The conditions of installation and operation which must be met in the introduction of such mechanically refrigerated cabinets are so variable that the problem of providing a mechanically refrigerated cabinet which is capable of meeting the conditions and at the same time of being produced at a cost low enough to make their use feasible, has been a difficult one. Furthermore, a mechanically refrigerated cabinet to be successful must be highly reliable in operation and require a minimum of attention from the storekeeper.

With a view of meeting the requirements above indicated, one object of the present invention is the provision of a mechanically refrigerated cabinet that is efficient and reliable in operation, simple and compact structurally, and having its main working parts arranged to be readily exposed for inspection when desired without interfering with the normal use of the cabinet.

A further object of the invention is the provision of a simple, effective and reliable system of connecting and operating a plurality of cabinets having a single refrigeration mechanism which serves for all of them.

Another object of the invention is the provision of a system of connecting and operating a plurality of cabinets which is flexible as to capacity and adaptable to varied conditions of installation and operation.

Other objects of the invention, more or less incidental or ancillary to the foregoing will appear in the following description which sets forth in connection with the accompanying drawings a preferred embodiment of the invention.

In the drawings, Fig. 1 is a sectional elevation showing a plurality of my improved cabinets installed in the basement and first floor of a building for operation as a unitary system.

Fig. 2 is an end elevation of the main or machine cabinet which is shown on the basement level in Fig. 1.

Fig. 5 is a vertical section through the apparatus for controlling the compressor-driving motor.

Fig. 6 is a vertical section through the water valve of the condenser with some of the parts in elevation.

Fig. 7 is a wiring diagram of the electrical connections of my improved cabinet system.

Fig. 7ª is a diagrammatic view of the main parts of the refrigeration mechanism, showing the refrigerant conduits connecting the evaporator, the compressor and the actuating devices of the control switch.

Fig. 8 is a side elevation of the brine pump and its driving motor of my improved system, some of the parts being shown in vertical section.

Fig. 9 is a section on the line 9—9, Fig. 8.

Figure 3:
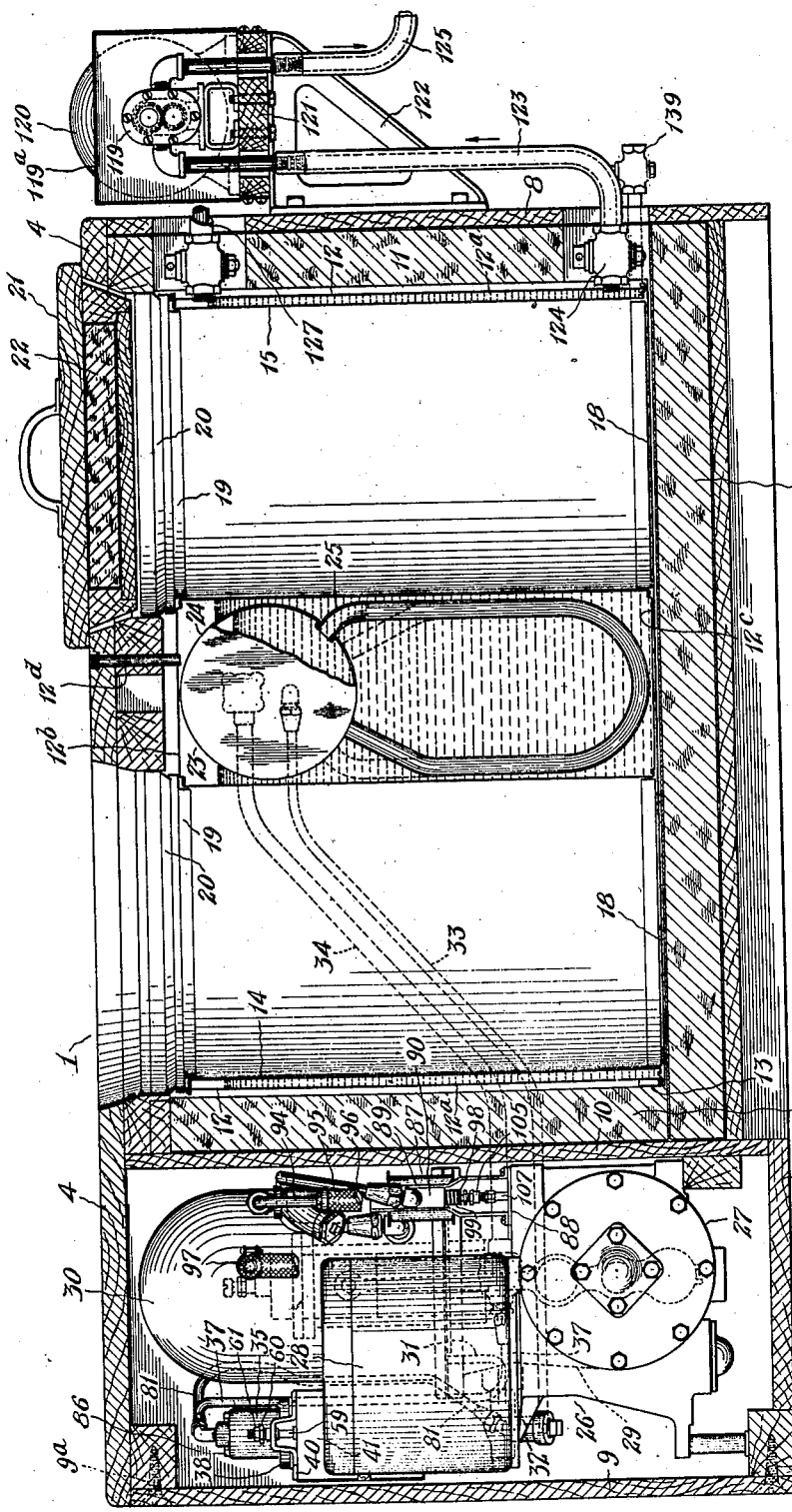
Fig. 3 is an enlarged vertical section through the main or machine cabinet, the section being taken on the line 3—3, Fig. 4.
Figure 4:
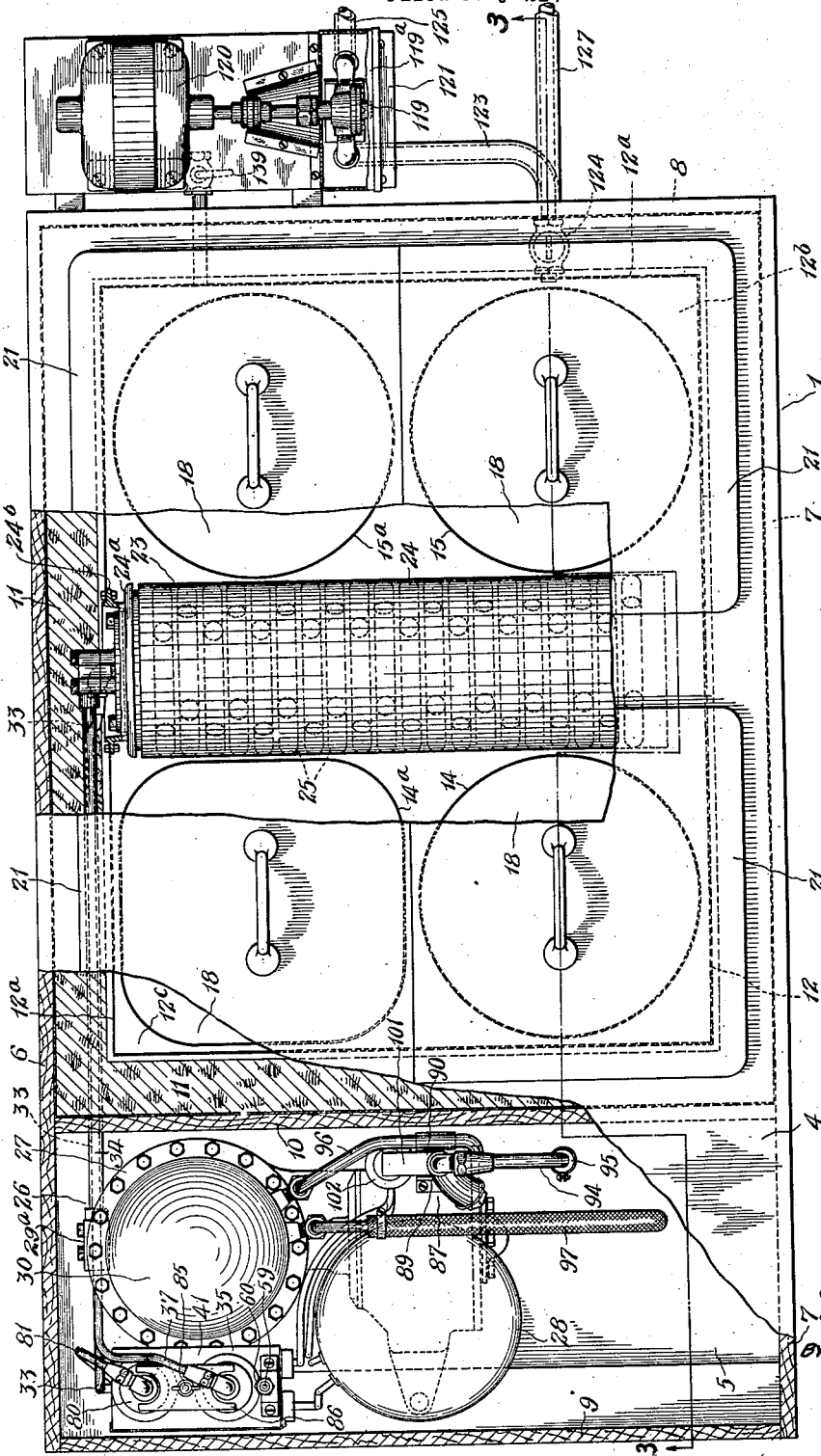
Fig. 4 is a plan view of the main or machine cabinet with some of the parts broken away and some shown in section.

Fig. 10 is a vertical section through a brine cooler which in some installations may be used in lieu of the machine cabinet shown in Figs 3 and 4.

Referring in detail to the construction illustrated, 1 is a main or machine cabinet which is shown in Fig. 1 as installed in the basement of the ice cream dealer's store building. 2 is an auxiliary ice cream cabinet installed on the floor above and 3 is a second auxiliary cabinet installed on the same floor as the cabinet 2.

Considering first the construction of the main cabinet 1, the same comprises a unitary frame with top and bottom walls 4 and 5, side walls 6 and 7, end walls 8 and 9 and a vertical partition 10 which divides the cabinet into two compartments. One of the exterior lateral walls of the smaller compartment, preferably the end wall 9 is in the form of a removable panel secured by screws 9$^a$ or the like.

The larger of these two compartments has its bottom, side and end walls lined with heat-insulating material 11. This insulating material may be of any suitable character but I have found cork board most satisfactory. The cork boards 11 constitute in effect part of the walls of the cabinet. Within these heat-insulating walls is arranged a sheet metal brine tank 12 which preferably rests upon a shallow sheet metal pan 13 which is supported by the bottom insulation 11. The pan 13 serves to catch and hold water resulting from defrosting of the tank in case the cabinet is taken from service, or split ice-cream or the like, thus preventing wetting and deterioration of the insulation of the cabinet. The tank 12 has vertical side and end walls 12$^a$ and top and bottom walls 12$^b$, 12$^c$. The top and bottom walls are apertured to receive the ends of two pairs of vertical sleeves 14, 14$^a$ and 15, 15$^a$, the ends of the sleeves being connected to the tank walls with liquid-tight joints. As shown, the sleeves 14, 15, 15$^a$ are cylindrical, while the sleeve 14$^a$ has straight sides with rounded corners. The vertical sleeves are designed to form chambers or receptacles to receive cans of bulk ice cream, say five gallon cans, or at least the sleeves 14, 15, 15$^a$ are so designed; the flat-sided sleeve 14$^a$ is so made to better accommodate brick ice cream. To take the impact of cans of ice cream lowered into the sleeves each of them is preferably provided at its lower end with a heavy sheet metal pan 18 which rests upon the pan 13. The top wall 4 of the cabinet is formed with apertures that register with the several sleeves and each sleeve is fitted at its upper end with guiding or protecting thimbles 19, 20. Each of the top wall apertures of the cabinet is fitted with a cover 21 which is preferably provided with a layer of heat-insulating material 22 of cork board or the like.

The pair of sleeves 14, 14$^a$ are spaced from the pair of sleeves 15, 15$^a$ to provide room for an evaporator or vaporizer designated in its entirety by 23. In so far as some features of the present invention are concerned this evaporator may be of any desired or suitable construction but the preferred evaporator 23 illustrated is like that of the refrigeration apparatus disclosed in my pending United States application, Serial No. 475,344, filed June 6th, 1921, and my Letters Patent of France, No. 547,971, to which reference may be had for a detailed showing and description of the vaporizer and the compressor mechanism associated with it. For the purpose of the present invention it is sufficient to note that the evaporator comprises a header 24 and a series of depending pipe loops or circulating tubes 25. One end of the header 24 is formed by a head casting 24$^a$ having a flange 24$^b$ which is connected with a liquid-tight joint to the adjacent side wall of the tank 12 at the periphery of an aperture through said wall by bolts or rivets, as shown in Fig. 4.

The tank 12 is filled with brine preferably to a level somewhat below the top wall 12$^b$ of said tank, so that a major part of the sleeves 14, 14$^a$ and 15, 15$^a$ and the major part of the vaporizer are immersed in or surrounded by the brine. It may be noted here that while, for the sake of brevity and convenience, I employ the term "brine" throughout this application, any suitable one of the known anti-freezing solutions can be used, and the term "brine" should be read in a correspondingly broad and comprehensive sence.

In the smaller compartment of the ice cream cabinet is mounted a suitable compressor and condenser mechanism designated in its entirety by 26. This mechanism, which is substantially the same as that shown in my pending application, Serial No. 475,344, and my French Patent No. 547,971, above referred to, need be described here only sufficiently to make clear the character of the automatic control mechanism employed, it being possible so far as some features of the present invention are concerned to employ any form of gas liquefying apparatus having automatic control means responsive to the temperature in the brine tank, and capable of being enclosed in the space available.

The apparatus 26 illustrated comprises a compressor 27 of the reciprocating piston type the crank shaft of which is driven by an electric motor 28 having its armature shaft arranged vertically to drive the crank shaft of the compressor through suitable worm gearing. On the flanged top of the crank case 29 of the compressor is mounted a condenser dome 30 within which are disposed water-cooled coils (not shown). The interior of the condenser dome 30 is connected by a passage 31, which leads downward through the crank case casting, to a pipe fitting 32 which in turn is connected by a tube 33 with the head $24^a$ of the vaporizer header, the passage way being controlled by a float-actuated valve disposed within the header as shown and described in my pending application, Serial No. 475,344, and my Letters Patent of France No. 547,971, above mentioned. The vapor space in the upper part of the header 24 is connected by a tube 34 with the interior of the crank case 29 through a hollow boss or attachment $29^a$ on the side of said crank case. The compressor crank case, the condenser dome 30, vaporizer 23 with the connecting tubes 33 and 34 constitute a closed system into which is charged some suitable working medium, such as sulfur dioxide. When the compressor is operated by the motor 28 the sulfur dioxide gas is drawn from the crank case, compressed and discharged under pressure into the condenser 30 where it comes in contact with the water-cooled tubes and is liquefied. This liquefied refrigerant gas then enters the passage 31 and flows through the tube 33 into the vaporizer 23 where it vaporizes and absorbs heat from the brine and thereafter in a gaseous state returns through the tube 34 to the crank case 29 of the compressor.

The compressor is automatically started and stopped by a pressure controlled mechanism which actuates a switch to connect and disconnect the driving motor 28 and, preferably, an electromagnetic valve which controls the flow of water through the condenser. The motor switch and its pressure actuating devices are shown in Fig. 5. 35 is a cylinder having an aperture 36 in which is secured one end of a conduit 37 which communicates at its other end with the tube 34 at the point where the latter enters the crank case of the compressor. That is to say, the cylinder 35 is thus placed in communication with the interior of the upper part of the header 24. It may be noted here that in my application and French Patent No. 547,971 the conduit corresponding to said conduit 37 extends to and is connected with the header of the evaporator, and in some cases this latter construction is to be preferred. The lower flanged end of the cylinder 35 is secured to a head 38 formed with a center depression which engages an opening 39 in a plate 40 on the top of a switch box 41. A vertical compressible bellows 42 has its lower end secured to a ring 43 clamped between plate 40 and cylinder 35. The upper end of bellows 42 is closed by a cap 44, the lower side of which is formed with an extension bored out to receive the upper end of a plunger 45 to which it is rigidly secured. The plunger 45 extends downwardly through an aperture in a bushing 46 which is screwed into plate 40. A saddle 47 rests upon the upper end of nut 46 and serves as a support for the lower end of a spring 48, the upper end of said spring engaging a flanged ring 49 mounted on plunger 45. The spring tends to maintain the bellows in extended position. In a recess 50 in the lower side of bushing 46 is arranged a spring 51, the lower end of which rests upon the adjustable nuts 52 on plunger 45. The bushing 46 can be adjusted vertically and secured by a lock nut 53. The tension of spring 48 is varied by adjustment of the bushing 46. Also, by adjustment of the nuts 52 the tension of spring 51 is varied and through it also the effective pressure of spring 48 against cap 44. A sleeve 54 serves to prevent the collapse inward of the bellows and to limit the downward movement of the plunger. It will be seen that the pressure of the vaporized refrigerant in the header 24 through the tubes 34 and 37 tends to depress the bellows and plunger 45 connected thereto. The amount of pressure necessary to depress the plunger 45 will depend upon the tension of the springs 48 and 51.

The lower end of plunger 45 operates the channel-shaped lever 55 to control the electric switch. Said lever is mounted on a pivot pin 56. Near one end of the lever 55 its web portion is apertured and over this aperture is secured an inverted U-shaped member $55^a$ formed with an aperture aligned with that through the lever. A reduced portion $45^a$ of the plunger extends into said aperture at its lower end and engages a flat spring $55^b$ secured in the channel of lever 55. A shoulder $45^d$ on the plunger, by engagement with the member $55^a$, serves to limit the flexing of the spring $55^b$, while a head $45^e$ on the lower end of the plunger is adapted to engage the member $55^a$ to elevate the lever and open the switch. Adjacent the member $55^a$, the lever 55 is connected by a pin and slot connection 57 to a lever 58 which in turn is pivoted to the lower end of an adjustable support 59. Said support can be adjusted up or down by turning the swivel nut 60. Lock nut 61 secures the support in adjusted position. A lug 62 on lever arm 58 is arranged to engage pivot pin 56, thus limiting the upward movement of said arm.

The swinging end of the lever arm 58 is arranged to operate the switch. The latter may be of any suitable form but as shown is of the snap-switch type and is designated in its entirety by 63. It has a base plate 63ᵃ on which are mounted contact members 64, 65 to which the conductors are connected in the usual manner. A post 66 on plate 63ᵃ has pivoted thereto, as by the knife edges shown, the arms 67 and 68. Arm 68 has a rigid extension 69 to the outer end of which is secured flat springs 70 (one of which is shown in Fig. 5). These springs carry the movable contact plate 71 of the switch. By yielding, springs 70 give the contact plate 71 a sliding movement when it first comes into engagement with the contact members 64, 65, thus keeping the contact surfaces clean. The arm 67 is secured to a link 72 connected to the end of arm 58. Two springs 73 connect the arms 67 and 68 so that when the link 72 is lowered from the position shown in Fig. 5, the springs will be carried below the knife edge supports of the arms and, as the line of centers is passed, snap the contact plate 71 into engagement with the members 64 and 65. When the link 72 is raised the reverse operation takes place. Arm 68 has its upper movement limited by a latch 74 which engages the edge of a slot 75 in said arm. When the arm is in lowered position the end of said slot is engaged by a notch 76 of the latch 74. Thus, when the contact member 71 is in closed position it is so held by means of notch 76 until the extension 77 of arm 67 engages a finger 78 on latch 74 and releases the latter against the tension of spring 79, thus permitting spring 73 to snap contact plate 71 away from the contact members 64, 65.

Assuming that the parts are in the position shown in Fig. 5, if the pressure in header 24 increases for any reason, for example a rise of the temperature in the header, the plunger 45 will be forced downward against spring 55ᵇ and cause the lever 55 and the arm 58 to move downward to throw the switch and start the motor.

It sometimes happens in mechanical refrigerators of the compression type that the pressure in the condenser becomes excessive, as for example if the supply of cooling water fails. It is essential to provide means for automatically stopping the motor under such conditions. In the apparatus shown in Fig. 5, I have indicated a second pressure actuated device comprising a cylinder 80 which is connected through a conduit 81 with the conduit 33, said connection preferably being made through the fitting 32 (see Fig. 3) which is designed to serve as a charging valve for the system.

In the cylinder 80 is arranged a bellows 82 and a spring 83 for holding the same extended. To the upper part of the bellows is connected a plunger 84, the construction of all of the various parts being essentially the same as of those of the previously described pressure device so that further description of said parts can be dispensed with. Both cylinders 80 and 35 are secured in position on the switch box by means of a post 85 and cross plate 86.

If the pressure of the refrigerant in the condenser becomes excessive, the bellows 82 is forced downward and the lower end of the plunger 84 is caused to engage the free end of the lever 55 thereby lifting the switch link 72 and disengaging the latch 74 to snap the switch open and stop the motor.

In the gas compressing and liquefying apparatus illustrated, the cooled water supplied to the condenser coils is automatically controlled by an electro-magnetically operated valve 87 (Figs. 3 and 6). To a base plate 88, which is secured to the top of the gear casing of the compressor mechanism, are secured two upright supports 89. The valve casing 90 is clamped between the upper ends of these supports 89. In the bore 91 of said casing is arranged a seat 92 for a ball valve 93. The inlet end of the casing is connected to the conduit 94 which in turn is connected to a flexible tube 95 leading to the water supply pipe. A conduit 96 is connected through a lateral opening with the bore to the valve casing below the valve seat. Conduit 96 has its other end connected to one end of the coil of the condenser within the dome 30, the other end of said coil being connected to a pipe 97 which leads to the waste pipe. A plug 98 is slidably fitted in the lower end of the valve casing bore, said plug being provided with packing to make a water-tight joint. Between a flange on the lower end of the plug and the bottom of the valve casing is arranged a spring 99. The plug 98 has an axial bore in which is tightly secured a valve-operating rod 100.

To operate the valve I provide a laminated U-shaped magnet 101 which has one leg clamped between the supports 89. The other magnet leg is provided with a winding 102 which is connected in series with the motor 28. The wound leg of the magnet has an extension 103 to which is pivoted the end of an armature 104, the other end thereof having an extension 105 in which is adjustably mounted contact screw 106 arranged to engage and lift the valve operating rod 100. 107 is an adjustable stop nut on the lower end of screw 106. A stop screw 108 limits the opening movement of the valve 93.

When the circuit through the motor 28 and the magnet coil 102 is closed, armature 104 is lifted and the valve 93 is opened. When said circuit is broken valve 93 is allowed to close.

A refrigerated ice cream cabinet constructed and fitted as described is capable of maintaining its food chambers at uniformly low temperatures for indefinite periods with minimum attention. As soon as the temperature of the brine surrounding the food chambers rises above a certain point the pressure in the vaporizer header 24 starts the motor of the compressor and this withdraws the vaporized gas in the vaporizer and compresses and liquefies it, and the lowering of the pressure in the vaporizer immediately increases the rate of vaporization therein with the resultant lowering of the temperature. As soon as the temperature, and consequently the pressure in the header 24, falls to a certain point the compressor motor is automatically disconnected and the compressor stopped.

By disposing the two pairs of food chambers in spaced relation to each other and arranging the vaporizer between them, as shown, I secure a natural circulation of the brine which substantially uniformly affects all four of the food chambers and maintains them at substantially the same temperature. Indeed I have found that the arrangement of a vaporizer, of the character illustrated, transversely of the cabinet with food chambers on both sides of it, secures a convection circulation of the brine so effective that it is possible to satisfactorily cool two or even more pairs of food chambers on each side of the one vaporizer, i. e., eight or more food chambers altogether, by the convection circulation alone.

The arrangement of the food chambers in transverse pairs or, in other words, in two rows extending longitudinally of the cabinet, is very advantageous in other respects. Thus, within the practically feasible limits for the cabinet width, said arrangement provides maximum food storage for a given brine tank wall area with a consequent minimizing of heat losses. Said arrangement also conforms to cabinet width dimensions adapted to accommodate a highly compact form of compressor-condenser unit with the result that a very high degree of compactness for the cabinet as a whole is attained in proportion to its capacity. It is noted in this connection that the relatively great food-holding capacity of the cabinet is due in part to the fact that the food chambers extend substantially the full depth of the cabinet to the bottom wall thereof.

By encompassing the compressor-condenser mechanism in a section or compartment of the same vertical and lateral dimensions as the main or food-holding section of the cabinet, the appearance of the cabinet is enhanced and in addition manufacture and handling are facilitated.

While a properly constructed and installed refrigeration apparatus such as that illustrated is capable of operating satisfactorily without attention for an indefinite period it should receive periodic attention and it is desirable that it be readily accessible. I provide for such accessibility by mounting the compressor, condenser control devices and driving motor in the end compartment of the cabinet so that it can be quickly and easily exposed by simply removing the panel 9. Thus access is afforded to the machine compartment without interfering at all with access to the food chambers. Ice cream cabinets must ordinarily be installed in the limited space available back of store counters or soda fountains and I have found the arrangement of the food chambers in two pairs with interposed vaporizer and the arrangement of the compressor and motor mechanism in an end compartment of the cabinet, to be one which lends itself especially well to the average space limitations referred to, as well as being highly satisfactory from the standpoint of operation and inspection.

While one cabinet, such as that above described, furnishes sufficient capacity for some dealers, there are many other cases in which the dealer must have a larger capacity and some dealers are so situated that they must carry a certain amount of ice cream in reserve storage. Again the capacity required by these latter dealers handling larger amounts of ice cream varies with the season, a larger capacity being necessary in the summer than in the winter. To meet conditions such as these I have devised an improved system of connecting and operating a series of refrigerated cabinets including a machine cabinet such as that previously described and one or more auxiliary cabinets which are not provided with refrigeration machines but are cooled by brine drawn from and returned to the main or machine cabinet.

As shown in Fig. 1 the main or machine cabinet is arranged in the basement of the dealer's store building, the auxiliary cabinet 2 is provided with three holes or food chambers and the second auxiliary cabinet 3 is provided with four food chambers. In the case of the cabinet 2 the three food chambers are arranged in a single row while in the case of cabinet 3 the four chambers are arranged in two pairs as in the case of cabinet 1 except that the two pairs are not spaced apart as far.

The construction of the frame, walls, brine tanks, food chamber sleeves and food chamber covers, is of the same character in the case of cabinets 2 and 3 as the construction of the corresponding parts of the machine cabinet 1 and a brief description of the auxiliary cabinets will therefore suffice. The cabinet 2 comprises the external walls 109, the cork insulation material 110, the brine tank 111 fitted with the three sleeves forming the three food chambers 112. The three food compartments are closed by the removable covers 113.

Similarly the cabinet 3 comprises the outer walls 114, the cork insulating material 115, the brine tank 116 formed with its two pairs of sleeves to provide four chambers 117, the food compartments being closed by the removable covers 118.

To effect the circulation of brine from the main tank 1 to the auxiliary tanks on the upper lever 1 provide a circulating pump 119 which may be of any suitable type but I prefer to use a gear pump. This pump is driven by an electric motor 120, both the pump and motor being mounted upon a shelf 121 which is supported on one end of the cabinet 1 by brackets 122. The suction passage of the pump 119 is connected to a pipe 123 which opens into the brine tank of the cabinet slightly above the bottom thereof, said pipe being controlled by a suitable turn plug 124. The discharge passage of the pump 119 is connected to a pipe 125 which leads to the cabinet 2 and opens into the brine tank 111 thereof slightly below its top. The brine tank of the cabinet 2 is connected to the brine tank of the cabinet 3 by a pipe 126 which opens into said brine tanks slightly below their tops, as shown. The brine tank of the cabinet 3 is in turn connected by a pie 127 with the brine tank of the cabinet 1, said pipe 127 opening into both brine tanks slightly below their tops. The pipes 125 and 126 are connected by a pipe 128 and valves 129, 130 and 131 are provided in the pipes 125, 128 and 126, respectively, so that it is possible when desired to put the cabinet 2 out of operation. When all three cabinets are in use the valves 129 and 131 are open and the valve 130 is closed, but by closing the valves 129, 131 and opening the valve 130 the flow of the cooling brine can be by-passed around the cabinet 2.

With a series of cabinets having their brine tanks connected as described, it will be seen that the circulating pump draws brine from the main cabinet at the lower level with a very small suction lift and then forces the brine upward against the relatively high head to the level of the upper cabinets, the pump and not the brine tank 12 sustaining the pressure incident to said head. The brine forced upward through the pipe 125 enters the brine tank 111 of the cabinet 2 and raises the level of the brine therein. To insure that the brine be actively circulated through the tank 111 and out through the pipe 126 into the brine tank 116 of the cabinet 3, the tank 111 is closed off tightly from the atmosphere so that the pressure generated by the circulating pump 119 is effective to force the brine from the tank of the cabinet 2 through the pipe 126 to the tank of the cabinet 3 notwithstanding the fact that the cabinets 2 and 3 are on the same level. However, in the case of the cabinet 3, its elevation above the cabinet 1 insures a rapid flow of the brine through the pipe 127 as the level of the brine rises in the tank 116 of the cabinet 3 so that it is not necessary that the tank 116 be tightly closed. In fact, it is desirable and important that the brine tanks of both the cabinet 3 and the cabinet 1 be open to the atmosphere through suitable vents. Accordingly, in case of brine tank 1, I provide a suitable screened vent tube $12^d$ which leads from the top wall $12^b$ of the brine tank through the top wall 4 of the cabinet. And in the case of the cabinet 3, I provide a similar vent tube $116^a$. Were no vent or breather passage provided for the tank of the cabinet 3, the stopping of the circulating pump and the subsequent siphon effect on the tank of the cabinet 3 would collapse it by the creation of a partial vacuum, a flat-walled tank being ill-adapted to resist great pressure either exterior or interior. On the other hand, if no vent passage were provided for the tank of the cabinet 1, air entrained in the brine returning from the tank of the upper cabinet would build up a severe pressure in the tank of cabinet 1.

I have shown the circulating pipes 123, 125, 126, 127 and 128 as covered with suitable insulating material or lagging and I prefer to also provide heat-insulating material for the pump 119. For this purpose I provide a casing $119^a$ in which wool felt or other suitable heat-insulating material can be packed.

I come now to the method of regulating the temperatures of the food chambers of the auxiliary cabinets. While the automatic control of the refrigeration mechanism in the main cabinet 1 is adapted to maintain the food chambers of that cabinet at any desired temperature, it is obvious that unless an active circulation of brine through all of the cabinets is maintained at all times, the temperatures of the food chambers in the auxiliary cabinets might differ materially from the temperatures in the main cabinet due to the different conditions to which the different cabinets are subject. Such constant circulation of the brine would be costly in consumption of electric current and wear of the apparatus and I have devised a special method of insuring suitable temperatures in the auxiliary cabinets with the expenditure of a minimum of energy in circulating the brine, and this method I will now describe.

As is indicated in Fig. 7, the pump motor 120 is connected in parallel with the compressor motor 28 in such a way that both motors are controlled by the automatic pressure controlled switch 63. Consequently, when the switch 63 is closed both the compressor and the brine circulating pump are thrown into operation and when said switch is opened the compressor is stopped and the circulation of the brine is stopped. Obviously this alone will not insure the maintenance of a sufficiently low temperature in the auxiliary cabinets 2 and 3, because these cabinets are likely to be in a warmer room than the main cabinet 1 and, with the cream being dispensed from cabinets 2 and 3 their covers will be frequently removed and the absorption of heat will for that reason be more rapid than in the case of the cabinet 1 which, when installed in the basement would ordinarily be used for holding or storing purposes. Therefore, in connection with the simple automatic control of the brine circulation, just described, I have adopted the expedient of making the ratio of the cubical brine capacity of each auxiliary tank to the total heat conducting capacity of its walls greater than the corresponding ratio for the main tank. I have found it satisfactory in practice to use a differential of about 10%. That is to say, if the ratio in question for the main or machine tank is taken as unity, I make the corresponding ratio for each auxiliary tank 1.1. For all conditions met with in ordinary practice this will insure that the food chambers in the auxiliary cabinets are kept at a temperature at least as low as are the food chambers in the main or machine cabinets. For the sake of manufacturing economy I prefer to make the insulation of all the cabinets uniform and when this is done the external area of the walls of the brine tank compartment of each cabinet may be taken as a measure of their heat conducting capacity. In practice I have satisfactorily employed 2-inch thick cork board as the insulating material for my cabinets.

I have found that with my improved way of constructing and connecting the main and auxiliary cabinets and of controlling the operation of the refrigeration apparatus, an adequately low temperature is maintained in the cabinets by the operation of the refrigeration mechanism for relatively short periods. In fact, in typical cases I find that operation of the compressor for two hours or so once in five or six hours is all that is required. It will thus be seen that an adequate circulation of brine for the entire system is secured with the expenditure of a minimum of energy and, at the same time, an automatic control of the brine circulation is secured without the use of any instrumentality other than that necessary for the automatic control of the refrigeration mechanism. It is obvious that my method of automatically controlling the circulation of cooling brine in unison with the operation of the compressor is applicable to any sort of brine circulating system, regardless of the form, number and arrangement of the brine tanks or containing means. When the main cabinet 1 is used alone, as is the case in the majority of installations, a forced circulation of the brine by means of the pump is ordinarily unnecessary and in such cases it will, of course, be understood that the cabinet is not fitted with a pump.

Under some circumstances, I find it desirable to provide in connection with one or more auxiliary tanks, a brine cooling tank having no provision for holding ice cream or other food, and in such cases I provide a simple brine tank fitted with a refrigeration mechanism, as shown in Fig. 10. Here the cabinet is provided with a casing 132 divided into a brine tank compartment and a machine compartment by a partition 133. In the former compartment is mounted a brine tank 134 just large enough to accommodate the vaporizer 135 which is operatively connected with the motor driven compressor and condenser unit designated in its entirety by 136 and mounted in the other compartment of the cabinet. The brine tank 134 is surrounded by insulating material, such as cork board and is provided with inlet and outlet pipes 137, 138 and in the same manner as the machine cabinet 1, previously described. Also, the compressor and condenser unit is of the same construction as that previously described in connection with the cabinet 1 and is mounted in the cabinet and connected with the vaporizer in the same manner as in the case of cabinet 1. Consequently, the brine cooling cabinet need not be described in further detail.

In the case of all of the cabinets which have been described it is desirable to provide the brine tank with a bottom drain cock, such as is indicated at 139 in Fig. 2, so that sediment which may gradually accumulate in the brine can be drained off.

In the present application I do not claim those features of my invention having to do with the construction of the food chambers and the brine tank without reference to the means for cooling the brine, as said features constitute the subject matter of the claims of my application Serial No. 673,399 which was filed as a division of the present application November 8, 1923.

Although I prefer to use a compression pump and cooling coils to condense and liquefy the refrigerant gas, as previously indicated, it is possible to use any form of gas liquefying apparatus having automatic control means responsive to the temperature in the brine tank. Furthermore, while I have shown and described in some detail the preferred forms of construction and preferred arrangements of the parts and devices, it will be understood that in all respects there can be wide variation without departing from the invention, the scope of the invention being indicated in the appended claims.

What I claim is:

1. A horizontally elongated refrigerated cabinet for food and the like having top, bottom and lateral exterior walls and means comprising an upright wall dividing the structure into a plurality of compartments, a brine tank disposed in one of said compartments, a plurality of open-topped food chambers extending downward into the brine tank and having their upper ends opening through the top wall of the cabinet, movable closures for said food chambers, and means for cooling the brine comprising a motor-driven compressor, a condenser and an evaporator operatively connected with the compressor and immersed in the brine of the brine tank, the said compressor being enclosed in another of said compartments of the cabinet and this compressor compartment having an opening and a closure therefor constituting an outside wall section of the cabinet and arranged to afford ready access to said compressor compartment without interfering with access to said food chambers.

2. A refrigerated cabinet for food and the like, having a unitary frame and walls dividing the structure into a plurality of compartments, a brine tank disposed in one of said compartments, a plurality of open-topped food chambers extending downward into the brine tank and having their upper ends opening through the top wall of the cabinet, movable closures for said food chambers, and means for cooling the brine comprising a motor-driven compressor, a condenser and an evaporator operatively connected with the compressor and immersed in the brine of the brine tank, the said compressor being enclosed in another of said compartments of the cabinet and this compressor compartment having an opening and a closure therefor constituting an outside wall section of the cabinet and affording ready access to said compressor compartment without interfering with access to said food chambers.

3. A horizontally elongated refrigerated cabinet for foods and the like having top, bottom and lateral exterior walls and means comprising an upright wall dividing the structure into a plurality of compartments, a brine tank disposed in one of said compartments, a plurality of open-topped food chambers extending downward into the brine tank and having their upper ends opening through the top wall of the cabinet, movable closures for said food chambers, and means for cooling the brine comprising a motor-driven compressor, a condenser and an evaporator operatively connected with the compressor and disposed in the brine tank with a plurality of the food chambers on each side of it, the said compressor being enclosed in another of said compartments of the cabinet and this compressor compartment having an opening and a closure therefor constituting an outside wall section of the cabinet and affording ready access to said compressor compartment without interfering with access to said food chamber.

4. A horizontally elongated refrigerated cabinet for foods and the like having top, bottom and lateral exterior walls and means comprising an upright wall dividing the structure into a plurality of compartments, a brine tank disposed in one of said compartments, a plurality of pairs of open-topped food chambers extending downward into the brine tank and having their upper ends opening through the top wall of the cabinet, the axial plane of each pair of said chambers being disposed to intersect the long sides of the cabinet, movable closures for said food chambers, and means for cooling the brine comprising a motor-driven compressor, a condenser and an evaporator operatively connected with the compressor and arranged in the brine tank between two pairs of said food chambers, the said compressor being enclosed in another of said compartments of the cabinet and this compressor compartment having an opening and a closure therefor constituting an outside wall section of the cabinet and affording ready access to said compressor compartment without interfering with access to said food chambers.

5. In a refrigerated cabinet for foods and the like, the combination of a brine tank, a plurality of pairs of open-topped food chambers extending downward into said tank to be surounded by the brine therein, and an evaporator for cooling the brine comprising a horizontally disposed header and a plurality of depending pipe loops having their ends connected to the header, the said evaporator being disposed between two pairs of the said food chambers 6. In a refrigerated food cabinet, the combination of a brine tank, a plurality of open-topped food chambers extending downward into said tank to be surrounded by the brine therein, and an evaporator in the brine tank comprising an elongated header and a plurality of depending pipe loops connected at their ends to the header, said header having one of its ends connected with a liquid-tight joint to a side wall of the brine tank at the periphery of an aperture through said wall, a refrigerant compressor and condenser mechanism outside of the brine tank and pipe connections for the refrigerant between said mechanism and the evaporator, said pipe connections having communication with the evaporator through the aforesaid end of the header independently of the said wall of the brine tank.

7. In a refrigerated cabinet for foods and the like, the combination of a brine tank, a plurality of pairs of open-topped food chambers extending downward into the said tank to be surrounded by the brine therein, said pairs of chambers being disposed transversely of the cabinet so as to form two rows of chambers extending longitudinally of the cabinet, and an evaporator in said tank for cooling the brine comprising a header and a plurality of depending pipe loops having their ends connected to the header, the said evaporator being disposed transversely of the cabinet between two pairs of the said food chambers.

8. In an elongated refrigerated cabinet of approximately store counter width for food and the like, the combination of a brine tank, a plurality of open-topped food chambers extending downward into the said tank to be surrounded by the brine therein, all of said food chambers being arranged in pairs disposed transversely of the cabinet so as to form two rows of chambers extending longitudinally of the cabinet, and means in said tank for cooling the brine therein consisting of a single evaporator extending transversely of the cabinet between two of said pairs of food chambers and substantially the full depth of the brine whereby two convection currents are set up in the brine on opposite sides of said evaporator.

9. A horizontally enlongated refrigerated cabinet for food and the like, having top, bottom and lateral exterior walls and means comprising an upright wall dividing the structure into a plurality of compartments, said top wall extending at substantially the same level throughout the length of the cabinet, a brine tank disposed in one of said compartments, a plurality of open-topped food chambers extending downward into the brine tank with their upper ends opening through the top wall of the cabinet, said chambers being arranged in two rows extending longitudinally of the cabinet, movable closures for said food chambers, means for cooling the brine comprising a motor driven compressor, a condenser and an evaporator operatively connected with the compressor and immersed in the brine of the brine tank, the said compressor being enclosed in another of said compartments at one end of the cabinet and this compressor compartment having an opening and a movable closure therefor constituting an outside wall section of the cabinet and affording ready access to said compressor compartment without interfering with access to the food chambers.

10. A horizontally elongated refrigerated cabinet for food and the like having top, bottom and lateral exterior walls and means comprising an upright wall dividing the structure into a plurality of compartments, a brine tank disposed in one of said compartments, a plurality of open-topped food chambers extending downward into the brine tank and having their upper ends opening through the top wall of the cabinet, movable closures for said food chambers, and means for cooling the brine comprising a motor-driven compressor, a condenser and an evaporator operatively connected with the compressor and immersed in the brine of the brine tank, the said compressor being enclosed in another of said compartments of the cabinet and this compressor compartment having an opening and a closure therefor constituting an end wall section of the cabinet and arranged to afford ready access to said compressor compartment without interfering with access to said food chambers.

11. A horizontally elongated refrigerated cabinet for food and the like, having top, bottom and lateral exterior walls and means comprising an upright wall dividing the structure into a plurality of compartments, a brine tank disposed in one of said compartments and extending to substantially the full depth thereof from the top wall to the bottom wall of the cabinet, a plurality of open-topped food chambers extending downward into the brine tank to the bottom thereof and having their upper ends opening through the top wall of the cabinet, movable closures for said food chambers, and means for cooling the brine comprising a motor-driven compressor, a condenser and an evaporator operatively connected with the compressor and immersed in the brine of the brine tank, the said compressor being enclosed in another of said compartments of the cabinet and this compressor compartment having an opening and a closure therefor constituting an outside wall section of the cabinet and arranged to afford ready access to said compressor without interfering with access to said food chambers.

12. A horizontally elongated refrigerated cabinet for food and the like having top, bottom and lateral exterior walls and means comprising an upright wall dividing the structure into a plurality of compartments, a brine tank disposed in one of said compartments, a plurality of open-topped food chambers extending downward through the brine tank substantially to the bottom wall of the cabinet and having their upper ends opening through the top wall of the cabinet, movable closures for said food chambers, and means for cooling the brine comprising a motor-driven compressor, a condenser and an evaporator operatively connected with the compressor and immersed in the brine of the brine tank, the said compressor being enclosed in another of said compartments of the cabinet and this compressor compartment having an opening and a closure therefor constituting an outside wall section of the cabinet and arranged to afford ready access to said compressor compartment without interfering with access to said food chambers.

13. In a refrigerating cabinet system, the combination of a main brine tank, a cabinet separate from said tank and fitted with an auxiliary brine tank and a food chamber extending into said tank and surrounded by the brine therein, means including a pump for circulating brine from the main tank to the auxiliary tank and back again to the main tank, an electric motor for driving the pump, electrically driven refrigerating apparatus operable independently of said pump motor and comprising an evaporator immersed in the brine in the main tank and a gas liquefier connected with the evaporator, and means responsive to the temperature of the brine in the main tank for starting and stopping the operation of said liquefier and simultaneously starting and stopping said pump motor.

14. In a refrigerating cabinet system, the combination of a main brine tank, a cabinet separate from said tank and fitted with an auxiliary brine tank and a food chamber extending into said tank and surrounded by the brine therein, the ratio of the cubical brine capacity of said auxiliary tank to the total heat-conducting capacity of its walls being greater than the corresponding ratio for the main tank, means including a pump for circulating brine from the main tank to the auxiliary tank and back again to the main tank, a motor for driving the pump, refrigerating apparatus comprising an evaporator immersed in the brine in the main tank and a gas liquefier connected with the evaporator, and means responsive to the temperature of the brine in the main tank for starting and stopping the operation of said liquefier and for simultaneously starting and stopping said pump motor.

15. In a refrigerating cabinet system, the combination of a main cabinet having a brine tank and a food chamber extending into said tank and surrounded by the brine therein, refrigerating apparatus mounted in the main cabinet and comprising an evaporator immersed in the brine of the said tank and a gas liquefier connected with the evaporator, an auxiliary cabinet having a brine tank and food chamber extending into said tank and surrounded by the brine therein, the ratio of the cubical brine capacity of the auxiliary tank to the total heat-conducting capacity of its walls being greater than the corresponding ratio for the main tank, means including a pump for circulating brine from the main cabinet tank to the auxiliary cabinet tank and back again to the main cabinet tank, a motor for driving the pump, and means responsive to the temperature of the brine in the main tank for starting and stopping the operation of said liquefier and for simultaneously starting and stopping said pump motor.

16. In a refrigerating cabinet system, the combination of a main cabinet having a brine tank and a food chamber extending into said tank and surrounded by the brine therein, refrigerating apparatus mounted in the main cabinet and comprising an evaporator immersed in the brine of the said tank and a gas liquefier connected with the evaporator, an auxiliary cabinet having a brine tank and food chamber extending into said tank and surrounded by the brine therein, the ratio of the cubical brine capacity to the external area of the auxiliary cabinet tank being greater than the corresponding ratio of the main cabinet tank, means including a pump for circulating brine from the main cabinet tank to the auxiliary cabinet tank and back again to the main cabinet tank, a motor for driving the pump, and means responsive to the temperature of the brine in the main tank for starting and stopping the operation of said liquefier and for simultaneously starting and stopping said pump motor.

17. In a refrigerating cabinet system, the combination of a main cabinet having a brine tank and a food chamber extending into said tank and surrounded by the brine therein, refrigerating apparatus mounted in the main cabinet and comprising an evaporator immersed in the brine of the said tank and a gas liquefier connected with the evaporator, an auxiliary cabinet having a brine tank and food chamber extending into said tank and surrounded by the brine therein, the said brine tanks being inclosed in insulating material of the same kind and thickness and the ratio of the cubical brine capacity to the external area of the auxiliary cabinet tank being greater than the corresponding ratio for the main brine tank, means including a pump for circulating brine from the main cabinet tank to the auxiliary cabinet tank and back again to the main cabinet tank, a motor for driving the pump, means responsive to the temperature of the brine in the main tank for starting and stopping the operation of said liquefier and for simultaneously starting and stopping said pump motor.

18. In a brine cooling and circulating system, the combination of a plurality of brine tanks comprising two tanks disposed at different levels, the upper tank having flat side walls and each tank being substantially filled with brine, means for cooling the brine in one of said two tanks, means for conveying brine from the lower tank to the upper tank comprising a pump arranged to draw brine from the lower tank and force it into the upper tank, and a pipe extending from the upper part of the upper tank to the lower tank to receive and conduct the overflow of brine from the upper tank to the lower tank, the interiors of both of said tanks being in communication with the atmosphere.

19. In a brine cooling and circulating system, the combination of a series of brine tanks a plurality of which are on one level and one of which is on a lower level, means for cooling the brine in the lower tank and means for effecting a circulation of brine through said tanks in series comprising interposed conduits which include an overflow pipe leading from one of the upper tanks to the lower tank and a pump disposed near the level of the lower tank and arranged to draw brine from the latter and force it up into one of the tanks at the upper level, each of said tanks in operation being substantially filled with brine and the upper tank which discharges into the overflow pipe having flat side walls and the tank or tanks through which the flow is forced to another tank on the same level being closed while the lower tank and the tank connected therewith by the said overflow pipe have their interiors in communication with the atmosphere.

20. A refrigerated cabinet for food and the like comprising in combination a brine tank having a food chamber extending into it, means for circulating brine in the tank, a motor for driving said circulating means, refrigeration apparatus operable independently of said motor comprising an evaporator immersed in the brine of the tank and a gas liquefier connected with the evaporator, and means responsive to the temperature of the brine in the tank for starting and stopping the operation of said liquefier and simultaneously starting and stopping the motor of said brine circulator.

In testimony whereof, I hereunto affix my signature.

JOHN R. REPLOGLE.